United States Patent [19]
Prothe

[11] Patent Number: 5,322,085
[45] Date of Patent: Jun. 21, 1994

[54] ROOT FEEDER

[75] Inventor: Loren L. Prothe, Lexington, Ky.

[73] Assignee: Weatherly Consumer Products, Inc., Lexington, Ky.

[21] Appl. No.: 80,038

[22] Filed: Jun. 18, 1993

[51] Int. Cl.$^5$ .............................................. A01C 23/02
[52] U.S. Cl. .................................. 137/614.2; 137/268; 239/310; 239/600
[58] Field of Search ............ 137/613, 268, 102, 614.2; 251/309, 314; 239/310, 600

[56] References Cited

U.S. PATENT DOCUMENTS

| | | | |
|---|---|---|---|
| 1,927,448 | 9/1933 | Terry | 137/614.2 |
| 2,580,755 | 1/1952 | Funk | 111/7.4 |
| 3,618,539 | 11/1971 | Daniels | 137/268 X |
| 3,783,804 | 1/1974 | Platz | 111/7.4 |
| 4,169,420 | 10/1979 | Kresge, Sr. | 111/7.1 |
| 4,333,493 | 6/1982 | Beiswenger et al. | 137/268 |
| 4,432,291 | 2/1984 | Shirley | 111/7.1 |
| 4,537,355 | 8/1985 | Calder | 239/600 X |
| 4,705,218 | 11/1987 | Daniels | 239/271 |
| 4,934,287 | 6/1990 | Guin et al. | 111/7.1 |

Primary Examiner—Martin P. Schwadron
Assistant Examiner—Kevin L. Lee
Attorney, Agent, or Firm—King and Schickli

[57] ABSTRACT

A root feeder for dispensing a hydro-fertilizer solution is provided. The head of the feeder includes a dual handle body formed integrally with a fertilizer mixing bowl. A back-flow preventer valve and a manual cut-off valve are connected in series inside the hollow body of one of the handles providing flow control of the water. A stepped bore is provided in which the valves are securely seated and sealed. A cap on the end of the handle includes an integral sleeve to provide additional support for the valves. The flow path for the water is through the sleeve and the valves directly into the mixing bowl. The back-flow preventer valve is sealed by an O-ring in the bore and is positioned adjacent the bowl so that full sealing force around the valve is obtained and prevention of back-flow is assured. A flow plate and elastomer diaphragm form the back-flow preventer valve; whereas, the cut-off valve is a ball type. The sleeve formed on the cap retains the ball in position in the cut-off valve and secures the position of the valves in the bore. The cap is retained by a snap action connection on the sleeve and at least one resilient prong with a hook that seats in an aperture in the handle.

10 Claims, 2 Drawing Sheets

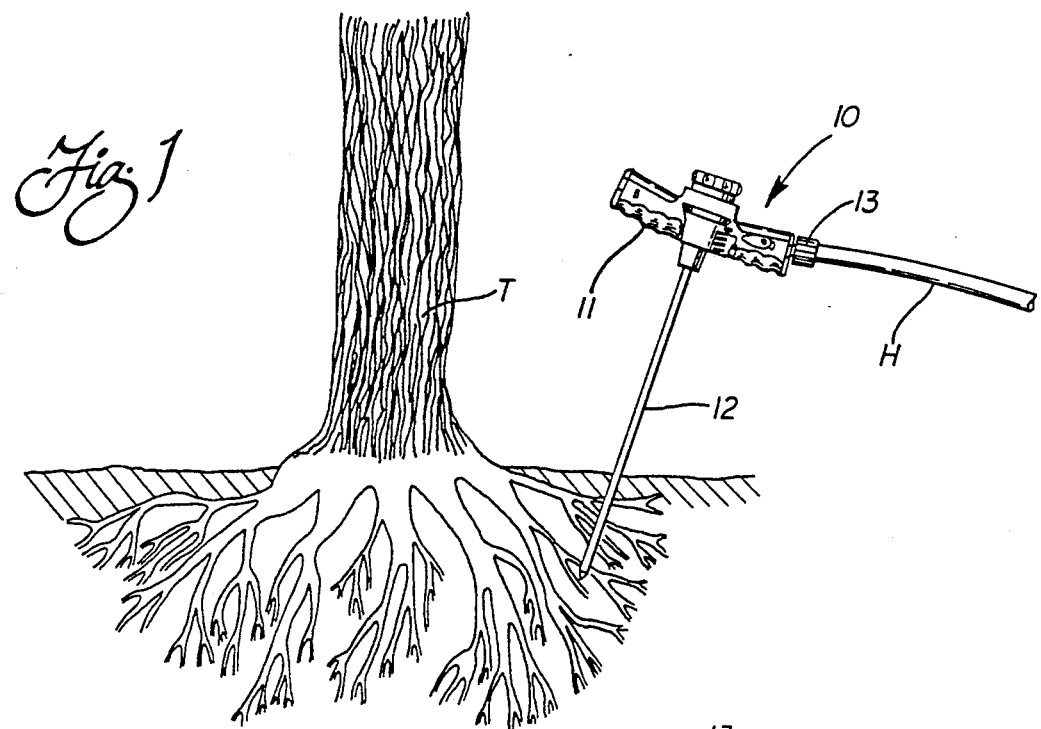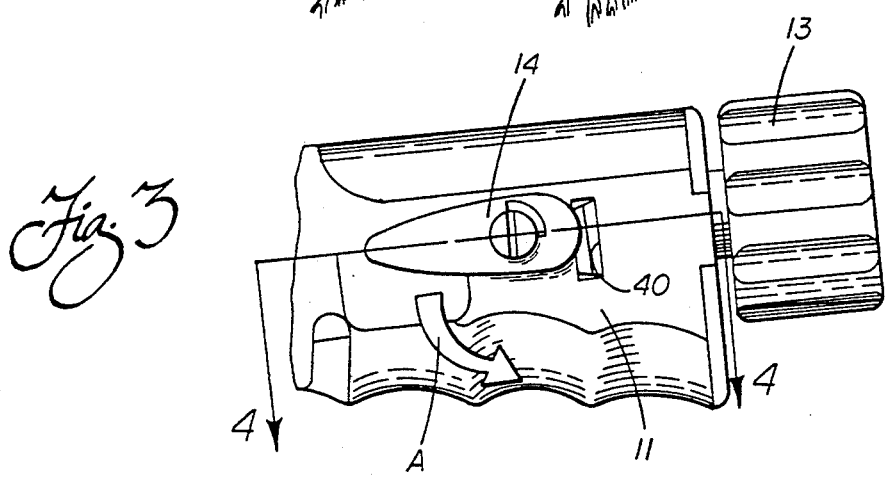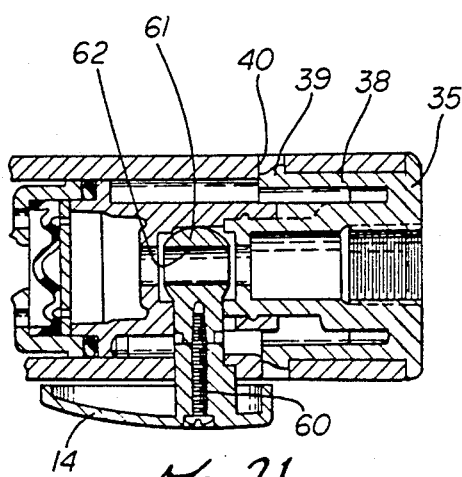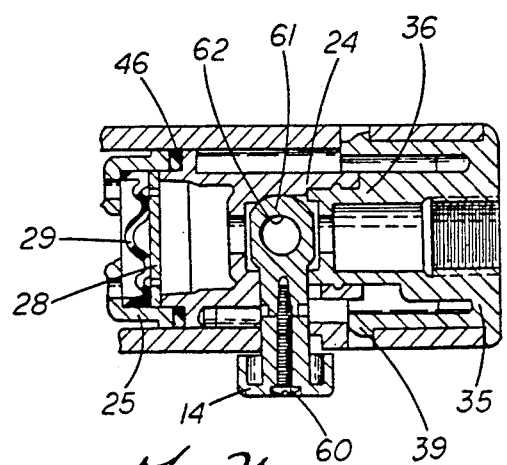

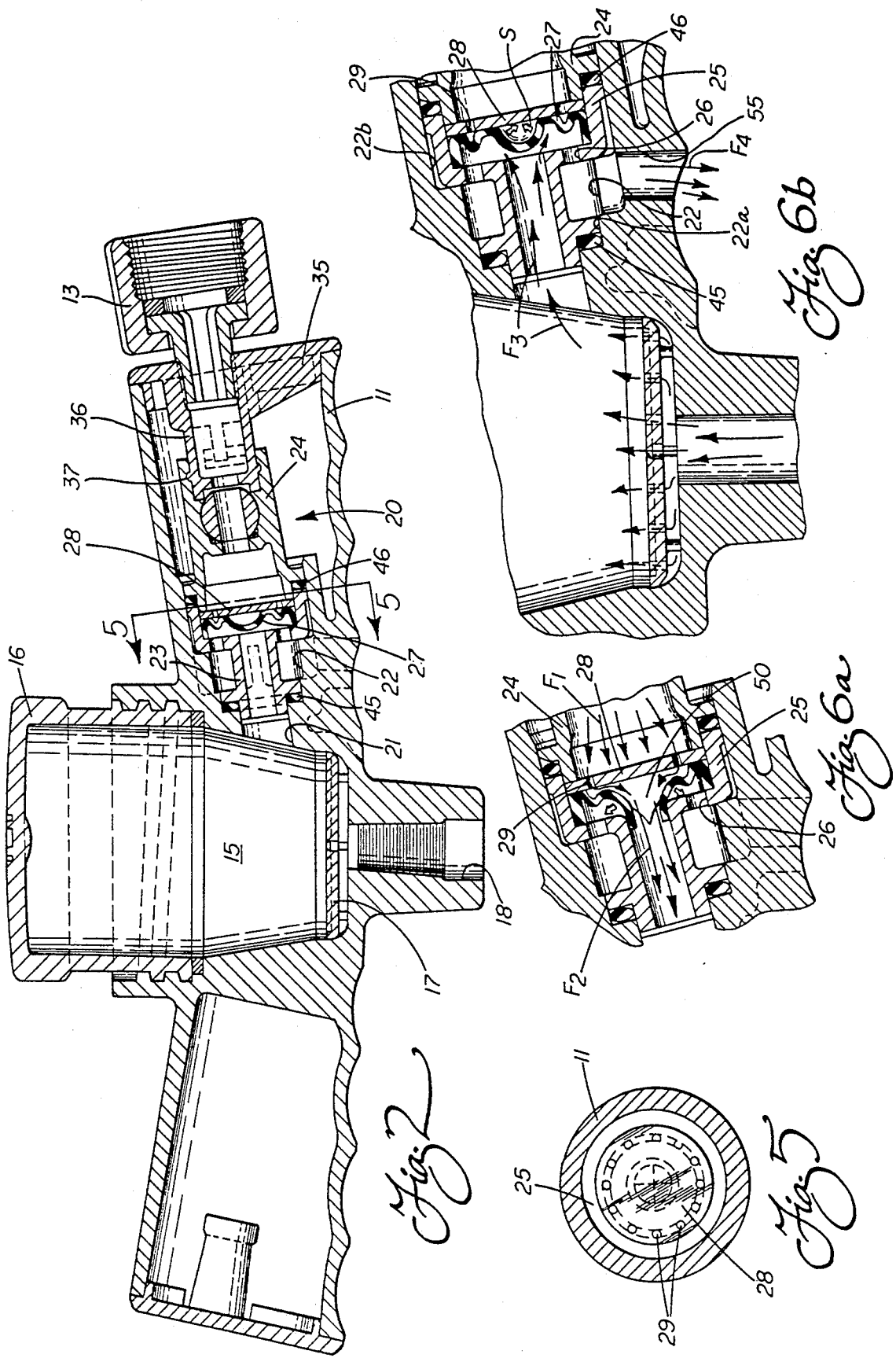

ROOT FEEDER

TECHNICAL FIELD

The present invention relates to a root feeder, and more particularly, to a feeder having an improved valving arrangement including for seating and retaining a back-flow preventer valve and a cut-off valve connected in series and housed in the hollow handle body.

BACKGROUND OF THE INVENTION

The value of providing a hydro-fertilizer solution directly to the roots of a tree or other living plant is well known. Horticulturists recommend this method of feeding since the nutrients are directed to a position immediately adjacent to where they are needed. The nutrients are not lost on the surface around the plant, and particularly in compacted and/or clay soils this is the only efficient method available to assure vigorous growth.

Over the years, there have been several proposals for making a root feeder that carries out the function in the most efficient manner. One of the most successful designs in the past is represented by the ROSS root feeder, as illustrated in U.S. Pat. No. 3,618,539. Over the years, there have been several improvements to this basic tool, including improvements to the nozzle portion at the end of the feeder tube, as represented by U.S. Pat. No. 4,705,218. Both of these prior patents are owned by the present assignee Other designs have appeared including a dual handle model as represented by the Shirley U.S. Pat. No. 4,432,291. The apparent improvement provided by the '291 patent involves an arrangement for dividing the flow into two paths, one for a hydro-fertilizer solution and another for pure water. A simple cut-off and dividing valve is provided for flow control.

Another proposal for modification of the nozzle at the tip of the feeder tube is illustrated in the Platz U.S. Pat. No. 3,783,804. This arrangement involves positioning of annular O-rings and/or annular diaphragm members around the outlet orifices of the nozzle tip, along with a check valve at this point in the flow path to prevent debris from entering the system.

While some of the predecessor root feeders have included a provision for preventing back flow, such as where there is a sudden break in a water line of the municipal system in the vicinity of the site of use, I have discovered an inherent problem in complying with the governmental regulations regarding back-flow prevention. By incorporating the back-flow prevention valve within the hose attachment coupling, under certain conditions during back-flow of the hydro-fertilizer solution, proper release of the solution directly to outside of feeder and onto the ground may not occur. In turn, due to the suction force or siphoning action causing the back flow, the full sealing force of the diaphragm in the back-flow preventer valve may not be realized. In particular, the central bulb of the diaphragm defining the flow path may collapse and be distorted resulting in the possibility of defeating the sealing function of the diaphragm. This can result in some of the hydro-fertilizer solution to leak and be drawn back past the hose attachment coupling and into the municipal water supply. An arrangement that prevents this from happening and that complies fully with the regulations of the Environmental Protection Agency, as well as the strict California regulations, is thus needed.

In the past, very little innovative thinking has gone into improving the structure of the valving arrangement for providing basic flow control including back-flow prevention. Typically, a separate cut-off valve positioned next to the fertilizer mixing bowl and a back-flow preventer valve incorporated into the hose attachment coupling are used. As far as I am aware, there has not been any attempt to integrate the valving arrangement by the designers, or to give consideration to proper positioning of the valves in the flow path, thus typically leading to a generally less efficient feeder, as well as one that is more expensive and difficult to assemble. Thus, there is a need in the art for improvement in the valving arrangement that defines the flow path of the water between the hose attachment coupling and the mixing bowl of the feeder.

SUMMARY OF THE INVENTION

Accordingly, it is a primary object of the present invention to provide a hydro-fertilizer feeder having an integrated valving/flow path arrangement that is efficient in operation meeting all governmental regulations, and is inexpensive to manufacture and easy to assemble.

It is another object of the present invention to provide a hydro-fertilizer feeder having a valving arrangement including a back flow preventer valve and a cut-off valve that are interconnected in series and are fully seated and sealed within a bore in the hollow body of a handle of the feeder.

It is still another object of the present invention to provide a valving arrangement for a feeder of the type described and including an interconnected cap for the end of the hollow handle body wherein the parts are not only easy to assemble, but are very compact in nature so as to minimize the space required, as well as the initial cost.

It is still another object of the present invention to provide a valving arrangement for a feeder wherein the back-flow preventer valve is positioned, seated and sealed in a bore directly adjacent to the mixing bowl to positively ensure against contamination of a water supply in the event of rupture of an upstream supply pipe.

It is another related object of the present invention to provide the back-flow preventer valve and a cut-off valve and retainer cap all in series providing a flow path for the water, and in which the valves are interconnected and the components retained and locked in position without the use of extra fasteners.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved apparatus is provided for flow control of the water from the hose attachment coupling to the mixing bowl of a root feeder. Specifically, a valving arrangement forms a flow regulator means in the handle body and defines the hydraulic flow path from the coupling to the bowl. Primarily, the regulator means prevents back-flow of hydro-fertilizer solution from the mixing bowl, and thus positively prevents contamination of the water supply in the event of a breakage in an upstream pipe. A simple on-off control valve is provided in series with the back-flow preventer valve for the convenience of the user.

The back-flow preventer valve is positioned immediately adjacent the mixing bowl and the on-off valve is coupled directly with it immediately upstream. A hollow cap including a sleeve is utilized to provide additional support and retention to the valving arrangement. The valves are securely seated and sealed in a specially designed bore within the hollow body forming the handle.

The bore receives the back-flow preventer valve so as to position it directly adjacent the mixing bowl of the feeder. An O-ring is fitted within the bore to provide a positive seal. By locating the valve in this position, the problem of leakage and ingestion of solution in the event of a pipe rupture in the municipal water system is obviated. An elastomer diaphragm of the valve is assured of receiving and maintaining the full sealing force of the vacuum pulled in the water system and thus in the feeder, as the water in the system is suddenly discharged nearby.

Furthermore, the bore in the body is stepped forming at least two annular chambers with the O-ring being positioned in the first chamber adjacent the mixing bowl. An enlarged portion of the valve is positioned and seated in the second chamber. A mating portion of the cut-off valve is also seated in the second chamber and is telescopingly received by said enlarged portion. A second O-ring is captured in between. The flow plate of the back-flow preventer valve includes an annular array of openings forming a part of the flow path. The elastomer diaphragm seals against the plate and is held captive by the mating end of the cut-off valve. A resilient means, in the form of a slit bulb is formed in the center portion of the diaphragm to allow flow during normal operation for feeding the plants, and then closing during back-flow conditions.

The stepped bore defines an intermediate chamber that is normally open to ambient pressure to assure free flexing of the diaphragm and proper opening and closing action. The retainer sleeve on the cap for the handle has a snap action connector and the end of the sleeve engages a ball element of the cut-off valve for retention within the valve.

It will be realized that the entire flow path of the valving arrangement positioned within the hollow body of the handle is thus made up of only three components which are self retaining, and particularly easy to assemble. As indicated the back-flow preventer valve is seated in the first chamber and includes an enlarged portion, and this part of the valve positions the flow plate and diaphragm in the flow path. These elements are retained by the mating end of the cut-off valve that seats within the second chamber, as well as telescopingly within the enlarged portion of the back-flow preventer valve. An O-ring is held captive between the two valves to provide additional sealing action.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 1 is a view showing the use of the dual handle root feeder for providing a hydro-fertilizer solution to the roots of a typical tree;

FIG. 2 is a cross sectional view taken through the head of the root feeder and showing the hollow body forming the handles with the valving arrangement in one of the handles;

FIG. 3 is a partial or cut-away side view of the handle incorporating the valving arrangement and illustrating the operation of the on-off lever for the cut-off valve;

FIGS. 4a and 4b are cross sectional views taken through the handle along the line 4 in FIG. 3, and illustrating the cut-off valve in the open and closed positions, respectively;

FIG. 5 is a cross sectional view taken along the line 5—5 of FIG. 2 and illustrating the enlarged portion of the back-flow preventer valve and the flow plate in position;

FIG. 6a is a partial, enlarged view of the back-flow preventer valve showing operation during normal flow condition; and FIG. 6b is another partial, enlarged view of the back-flow preventer valve and the adjacent fertilizer mixing bowl showing operation during back-flow conditions.

Reference will now be made in detail to the present preferred embodiment of the invention, an example of which is illustrated in the accompanying drawings.

DETAILED DESCRIPTION OF THE PREFERRED EMBODIMENT

Reference is now made to FIG. 1 showing an improved, dual handle root feeder 10 incorporating the concepts of the present invention. The head of the feeder 10 includes a hollow body 11 (see also FIG. 2) and attached thereto is a feeder tube 12 designed to impale the ground for feeding the roots of a tree T, or a similar plant. A hose H, connected to a spigot and in turn to the municipal water supply is connected through a hose attachment coupling 13. As best illustrated in FIG. 3, an on-off valve lever 14 is mounted on the body 11 to allow the user to control the supply of water through the root feeder 10. An action arrow A is included to show the direction of movement to turn the valve (which will be described in detail below), from the on position to the off position. It will be understood by those of skilled in the art that while the preferred embodiment of the present invention is illustrated as a root feeder 10, the principles are equally applicable to a feeder for hydro-fertilizer solution using a tubular wand and spray head in place of the feeder tube 12, or any similar equivalent arrangement.

With reference back to FIG. 2, it is readily apparent that the hollow body defining the dual handles is also integral with structure defining a fertilizer mixing bowl 15. A screw-on dome 16 is provided to close the bowl and a strainer 17 is provided in the bottom. As is well known, the typical use of the feeder 10 is to provide solid sticks of granular fertilizer within the bowl and upon mixing with the water supplied through the valving arrangement the feeder is operative to dispense a hydro-fertilizer solution through a bottom feed orifice 18. The orifice 18 is threaded so as to provide a convenient manner of attaching the tube 12, a tubular wand or equivalent structure.

A flow regulator means, generally designated by the reference numeral 20, is incorporated into the handle of the body 11, as best shown in FIG. 2. This regulator means is in fact a novel valving arrangement that defines the hydraulic flow path from the supply entering through the hose attachment coupling 13 to the output end defined by an angled mixing orifice 21 adjacent the mixing bowl 15. A stepped bore 22 is formed inside the hollow body 11 and connects directly to the orifice 21. In a unique fashion, the bore 22 serves to receive and position the flow regulator means 20, which includes a back flow preventer valve 23 and a manual cut-of valve 24 (operated by the lever 14, described above).

As best shown in FIG. 6b, the bore 22 is divided into a first chamber 22a that receives a shouldered tube forming a part of the back flow preventer valve 23 and a second chamber 22b receiving and supporting an enlarged portion 25. In between the first and second chambers 22a, 22b is an intermediate chamber formed by the bore. To connect the intermediate chamber to the second chamber upstream is a plurality of connecting apertures 26. The enlarged portion 25 receives an elastomer diaphragm in juxtaposition to a flow plate 28 having an annular array of flow orifices 29.

A cap 35 on the end of the handle of the body 11 includes an integral sleeve 36 extending toward the valving arrangement. The cap and the sleeve have a hollow portion so that in combination with the valving arrangement a flow path is provided from the hose attachment coupling 13 all the way through to the mixing orifice 21 during normal operation of the feeder 10. The integral sleeve 36 mates with the adjacent end of the cut-off valve 24 to provide additional support for the valves 23, 24. Also the sleeve 36 includes an annular bead 37 that snaps into a corresponding annular groove to lock the cap to the valving arrangement. In turn, to lock the cap 35 to the hollow body 11, at least one integral prong 38 including a hook 39 is designed to mate with a slot 40 in the side (see FIGS. 4a, 4b and also FIG. 3).

Thus, it can already be seen that the valves 23, 24 of the flow regulator means 20 and the cap 356 are readily assembled in series and positioned in a fully seated condition in the body 11. In addition, a first O-ring 45 is positioned between the shoulder of the tube 23 and the downstream end of the stepped bore 22 in the first chamber 22a. Similarly, a second O-ring 46 is seated around the end of the enlarged portion 24 of the back-flow preventer valve 23, by being placed over the end and against the shoulder on the mating, telescoping end of the valve 24 during assembly (see FIG. 1, 6a and 6b). By utilizing O-rings in this manner, securely held in position as illustrated and described, the entire valving arrangement 20 is assured of being sealed. Since the back-flow preventer valve 23 is positioned immediately adjacent the mixing orifice 21 where it enters the mixing blow 15, the full sealing arrangement of the diaphragm 29 is further assured. Thus, there can be no leakage or ingestion of solution into the flow path to disrupt the back flow prevention function, that is possible to be experienced with prior art arrangements.

During normal feeding operation, the flow of water is from the hose H, through the coupling 13, the cap 35 and then through the cut-off valve 24, as illustrated by the flow arrows $F_1$ (see FIG. 6a). The flow engages the plate 28 and is forced through the array of openings 29 so as to enter the interior of the valve 23. The central bulb or nipple of the diaphragm 29 is formed with a central cross-slit opening 50 to allow the flow path to continue as illustrated by the flow arrows $F_2$. As illustrated, the sides of the bulb seal against the narrow annular opening just downstream of the enlarged portion 25 of the valve 23. From here, the flow continues through the orifice 21, and since it extends at an angle to the mixing bowl 25, provides efficient mixing and dissolving of the fertilizer sticks to form the hydro-fertilizer solution that is ultimately transferred through the feeder tube 12 to the plant. As illustrated in the FIGS. 6a and 6b, the intermediate chamber of the bore 22 communicating through the connecting apertures 26 is allowed to remain open to the atmosphere through outlet passage 55 so that a vacuum is not created in this area. As long as the normal operation of the root feeder 10 continues, the flow $F_2$ provides efficient mixing in the bowl 10, and in turn an efficient feeding process.

Once the normal feeding operation is concluded, the water remaining in the mixing bowl 15 and to a large extent in the valving arrangement of the flow regulator means 20 continues to drain through the feeder tube 12 and the passage 55 until the diaphragm 29 finally closes. Then, once the hose H is disconnected from the coupling 13, the remaining water in the system can drain by retro-flow through said coupling. However, if during normal operation with the hose H supplying water from a municipal supply, a break occurs in a pipe in the system, the water flowing out of the system does tend to generate a forced retro-flow of water. Indeed, if the point of operation of the feeder 10 is considerably higher in elevation than the point of the break in the system, a substantial vacuum is created tending to suck or siphon the liquid from the valving arrangement, and indeed from the mixing bowl 15 and the feeder tube 12.

However, in the feeder 10 of the present invention once back-flow conditions are generated, the diaphragm 27 is quickly closed by operation of the vacuum on the supply or cut-off valve 24 side since the slitted opening 50 of the central bulb reverses to seal itself (see FIG. 6b). The annular sealing ring of the diaphragm around the outside of the bulb blocks the flow into the annular array of openings 29 (note the suction arrows S in FIG. 6b and the retro-water flow arrows $F_3$ indicating this action).

Advantageously, inadvertent contamination of the municipal water supply with hydro-fertilizer solution is prevented in a very efficient manner by immediate and complete discharge or dumping of the trapped solution through the outlet passage 55, as shown by flow arrows $F_4$, and onto the ground. Even in the unlikely event the diaphragm 27 is distorted, such as by forming a fold as it depresses against the plate 28, contamination is avoided.

Of importance, as indicated above, is the fact that the back-flow preventer valve 23 is immediately adjacent the hydro-fertilizer solution in the bowl 15 and is sealed by the first O-ring 45. There are no exposed and loose parts, such as the hose coupler that can be jammed, or otherwise tampered with, to prevent immediate release of the solution. The full force of the suction or siphoning action S, and the immediate atmospheric pressure on the downstream side of the diaphragm 27 holds it closed. Thus, the firm and sure closing of the elastomer diaphragm 27, as well as the immediate dumping of solution, prevents the possibility of contamination of the water supply.

With reference to FIGS. 2, 4a and 4b, further details of the cut-off valve 24 of the flow regulator 20 can be realized. The lever 14 is connected by a fastener 60 to a ball element 61 that has a central aperture 62 extending through it. Thus, the flow path is open in the position illustrated in FIG. 4a, which is of course utilized during normal operation. When the lever 14 is turned in the counterclockwise direction in accordance with arrow A (see FIG. 3), the ball element 61 is rotated so that the flow is cut-off through the opening 62, as can be seen in FIG. 4b. During assembly, the ball element 61 is inserted through the upstream end of the valve 24, and then the fastener 60 is used to mount the lever 14. The mating end of the sleeve 36 engages the ball element 61 for retention.

Thus, to review the assembly process of the flow regulator means 20 during manufacture of the feeder tube 10 of the present invention, the O-ring 45 is positioned on the shouldered tube of the back-flow preventer valve 23 and the flow plate 28 and the diaphragm 29 are mounted in the enlarged portion 25. This sub-assembly is then inserted into the hollow body 11 so as to mate with the stepped bore 22. Next the second O-ring 46 is positioned on the shouldered end of the cut-off valve 24 and the flow cut-off ball element 61 is inserted through the upstream end with the stem mating with the side slot provided. Next, this sub-assembly is placed in the hollow body 11 with the shouldered end mating in a telescoping manner with the enlarged portion 25 of the back-flow preventer valve 23. As illustrated, the end of the cut-off valve 24 engages the flow plate 28, and is thus operative to fix the plate and the diaphragm 29 securely in position. The control lever 14 and fastener 60 are aligned with the stem of the ball element 61 to complete this connection. The cap 35 is aligned with the near end of the cut-off valve 24 and is pressed into position until the bead 37, along with the hook 39, snap to lock the full assembly together. Finally, the hose attachment coupling 13 can be screwed into position in the hollow center section of the cap 35.

In summary, numerous benefits and advantages have been described which result from employing the concepts of the feeder 10 incorporating the flow regulator means 20 including the valving arrangement of the back-flow preventer valve 23 in series with the cut-off valve 24. The valves are securely seated and sealed in a novel manner within the stepped bore 22 and with the valve 23 immediately adjacent the mixing bowl 15. In this manner, efficient operation of the back-flow preventer valve 23 is assured including immediate release of solution during back-flow to prevent leakage and ingestion of the solution into the valving arrangement, as is possible in the prior art. The flow regulation function is completed by the cut-off valve 24 which is mounted also in a unique manner, and sealed within the stepped bore 22. The cap 35, including the novel connecting sleeve 36, completes the flow path, helps to hold the valving arrangement together and captures the ball element 61 of the cut-off valve 24.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. A feeder for connection to a water supply to dispense a hydro-fertilizer solution in a controlled manner comprising:

a hollow body defining at least a handle and a fertilizer mixing bowl;

flow regulator means in said handle defining the hydraulic flow path from the supply to the bowl and provide the required flow control;

a bore in said handle to receive and position said regulator means;

said regulator means including in series a back-flow preventer valve adjacent said bowl and a manual cut-off valve;

said valves being securely seated and sealed in said bore; and a cap on the end of said handle including an integral sleeve mating with the adjacent end of said cut-off valve to provide additional support for the valves, whereby the valves and cap may be readily assembled in series in a fully seated, sealed and supported condition in said handle and back-flow of said hydro-fertilizer solution is prevented.

2. The feeder of claim 1, wherein is provided an O-ring in said bore to seal said back-flow preventer valve; said O-ring being positioned adjacent said bowl, whereby full sealing force around said valve and prevention of back flow is assured.

3. The feeder of claim 2, wherein said bore is stepped forming at least two annular chambers in which said back-flow preventer valve is seated; said O-ring being positioned in the first chamber and an enlarged portion of said valve being positioned in said second chamber.

4. The feeder of claim 3, wherein the mating portion of said cut-off valve to said back-flow preventer valve is also seated in said second chamber and in said enlarged portion of said back-flow preventer valve; and an O-ring for sealing between said valves and around said cut-off valve.

5. The feeder of claim 4, wherein said back-flow preventer valve includes a flow plate with an annular array of openings forming a part of said flow path and an elastomer diaphragm for sealing against said plate for preventing the back flow of the solution, said diaphragm including resilient means for opening to form a part of said flow path during normal operation and closing during back-flow conditions.

6. The feeder of claim 5, wherein said resilient means is formed by a slit in said diaphragm.

7. The feeder of claim 6, wherein said stepped bore defines an intermediate chamber filled with ambient air to assure free flexing of said diaphragm for proper opening and closing action.

8. The feeder of claim 1, wherein said sleeve of said cap includes a snap action connector to provide retention in said cut off valve.

9. The feeder of claim 8, wherein said cap includes at least one resilient prong with a hook, and said body includes an aperture for receiving said hook to provide snap action retention of said cap and said valves forming said regulator means.

10. The feeder of claim 1, wherein said cut-off valve includes a rotatable ball element with a passage forming a part of the flow path when in the open position;

the adjacent end of said valve having a sufficient opening to receive the ball element during assembly;

said sleeve of said cap mating with said valve so as to engage said ball element for retention.

* * * * *